United States Patent [19]
Reed

[11] 3,795,172
[45] Mar. 5, 1974

[54] APPARATUS FOR RAPIDLY ACCELERATING AND CUSHIONABLY DECELERATING A PISTON-LIKE MEMBER

[75] Inventor: Wilbur B. Reed, Cambell, Calif.

[73] Assignee: The United States of America as represented by the Secretary of the Navy, Washington, D.C.

[22] Filed: Sept. 5, 1972

[21] Appl. No.: 285,961

[52] U.S. Cl............ 89/1.5 R, 89/1.806, 244/137 R
[51] Int. Cl................................................ F41f 5/02
[58] Field of Search.... 89/1.5, 1, 1.806, 145 B, 1 B; 244/137; 188/1 C

[56] References Cited
UNITED STATES PATENTS

| | | | |
|---|---|---|---|
| 2,736,236 | 2/1956 | Martin | 89/1 B |
| 3,270,618 | 9/1966 | Stott | 89/1 R X |
| 3,218,849 | 11/1965 | Marvinney et al. | 89/1.806 X |
| 3,228,492 | 1/1966 | Blumrich | 188/1 C |
| 3,400,661 | 9/1968 | Coon et al. | 89/145 B |

*Primary Examiner*—Samuel W. Engle
*Attorney, Agent, or Firm*—R. S. Sciascia; P. N. Critchlow

[57] ABSTRACT

By way of illustration, the apparatus may be used to launch rather heavy, spherical objects from a travelling space vehicle. In this event, the piston cradles the sphere and is driven by a high-thrust, short duration-time rocket motor. At launching velocity snubber assemblies arrest the piston with a minimum of recoil. The snubbers include rods secured to the piston for free travel with it until launching velocity is reached. At that point, the rods engage snubber pistons which are arrested by honeycomb cylinders.

10 Claims, 3 Drawing Figures

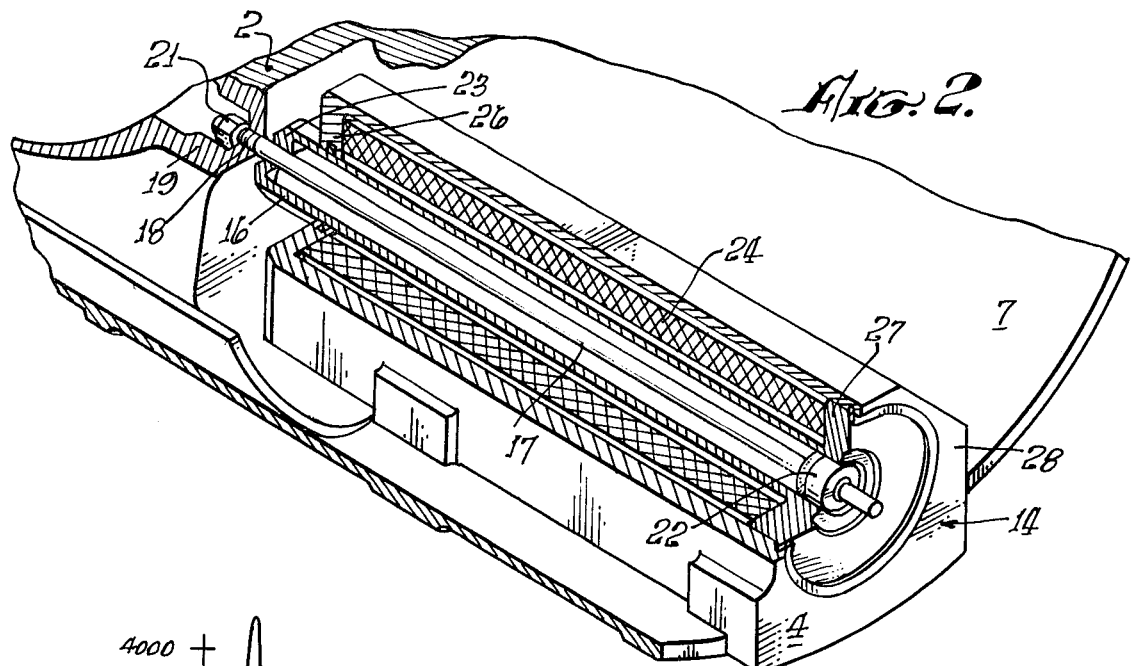
FIG. 2.
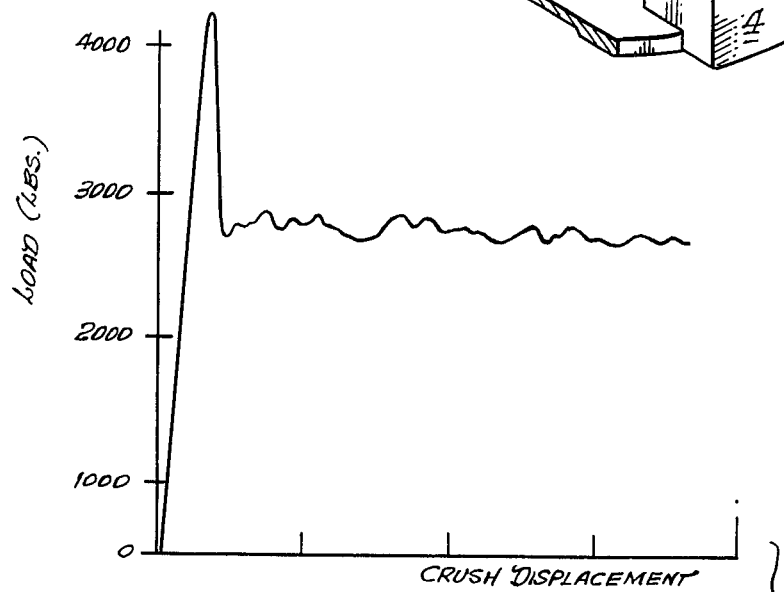
FIG. 3.
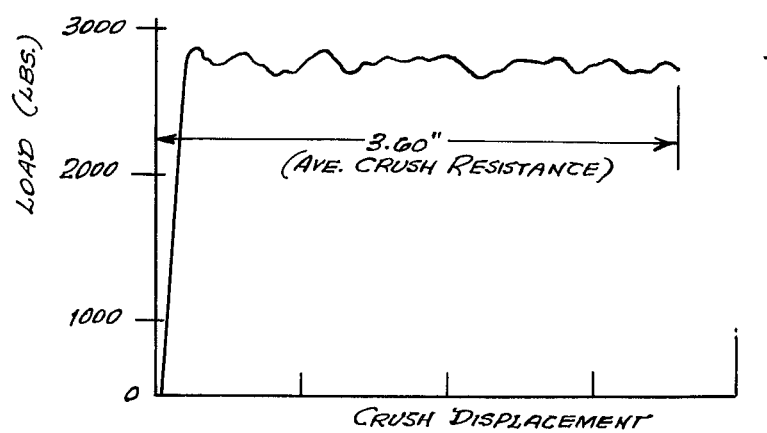

APPARATUS FOR RAPIDLY ACCELERATING AND CUSHIONABLY DECELERATING A PISTON-LIKE MEMBER

BACKGROUND OF THE INVENTION

The present invention relates to energy absorbers capable of arresting high speed pistons with a minimum of reaction forces.

The principles of the invention can be illustrated by considering its use in absorbing the kinetic energy generated by a piston driven at a high speed sufficient to launch a relatively heavy object. In particular, one of the principal, uses is its incorporation in a space vehicle to launch heavy spheres into space without appreciably affecting the flight of the craft or missile. Such spheres are launched for a variety of purposes including optical experiments, electromagnetic transmissions, or the expulsion of chemicals, vapors or other objects to obtain scientific data. One particular launcher, for example, was designed to meet such pre-set conditions as the ability to launch a 195 pound, fifteen inch sphere at a launch velocity of 50–68 feet per second while the space vehicle was being accelerated to about 9-g, the launch taking place at an altitude of 250 KFT and in a direction perpendicular to the line of flight. Lateral loads generated by the launch were not to exceed 7,000 pounds and, of course, the launch was to be clean in that no debris or 'space junk' was generated and the surfaces of the vehicle and craft were not contaminated by the launch.

With these rather restrictive requirements, the use of conventional launchers appeared to be eliminated. Other launching devices, such as mechanical springs, gas generators, or nitrogen storage bottles, presented serious problems involving complexity, excessive cost or simply the fact that they would not work in a reliable manner. Also, space and weight considerations presented critical problems which obviously would increase as the mass and ejection velocity of the launch increased.

Consequently, one of the objects of the present inventive effort was to provide a sphere launcher capable of meeting the foregoing requirements.

A more generalized object of the invention has been to provide apparatus for rapidly absorbing the thrust force of a travelling piston, the absorption being accomplished with a minimum generation of reaction or recoil forces.

Another object was to provide energy-absorbing apparatus capable of permitting a working piston to freely and rapidly accelerate to a maximum velocity prior to the initiation of the energy absorption.

A further object was to provide an accelerating force which has a short-duration burn or thrust time and which is highly predictable to the extent that a particular thrust level is reached in a designed time interval permitting the maximum thrust to be developed and then quickly cut-off prior to the energy absorption phase of the operation.

Another object was to provide a cushioning means having repeatable load/deflection characteristics.

Other objects and their attendant advantages will become apparent in the ensuing description.

BRIEF DESCRIPTION OF THE DRAWING

A preferred embodiment of the present invention is illustrated in the accompanying drawings of which:

FIG. 2 is a partial sectional view of one of the two snubber assemblies employed to absorb the kinetic energy buildup of the sphere launcher, and FIG. 3 shows load/deflection curves for a honeycomb cylinder employed to absorb the energy buildup of the launch.

DESCRIPTION OF THE PREFERRED EMBODIMENT

Figure 1:
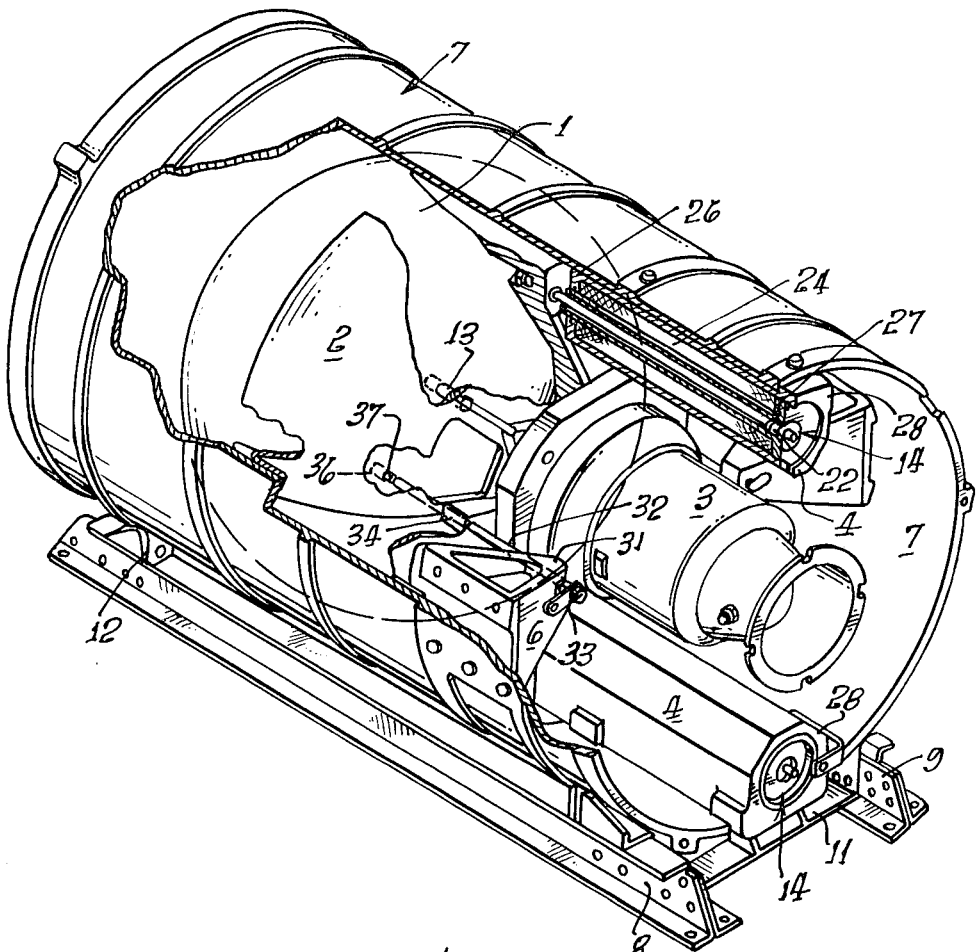
FIG. 1 is a partial sectional view showing the overall arrangement of a sphere launcher.

Referring to FIG. 1, the illustrated apparatus is intended to launch a 15 inch sphere 1 cradled in the forward end of a launcher piston 2 that is driven by a high thrust, rocket-type motor 3 carried by the launcher piston. Snubber assemblies 4, decelerate the piston and cushion or absorb the kinetic energy buildup when the piston is accelerated to launching velocity. A tension stud arrangement 6 securely holds the sphere in its piston-cradled position and, of at least equal significance, it also initially restrains piston 2 until the motor attains a predetermined thrust level. Each of these individual major components subsequently will be described in greater detail.

As shown in FIG. 1, all of the components are contained within a launcher barrel 7 which is a smooth-bore, semi-rigid, rib reinforced structure machined from a forged aluminum cylinder, this particular barrel being approximately 26.2 inches long with an inside diameter of 16 inches and a nominal wall thickness of 0.156 inches. Preferably, the 16 inch i.d. is hard anodized and coated with a film of baked-on dry lubricant. Its supporting structure includes two longitudinal aluminum channels 8 and 9 secured to each other and to the barrel by two transverse aluminum channels 11 and 12. The lower flanges of the channels provide a mounting interface with the parent vehicle, which, in this instance, may be considered as the previously-described space vehicle. As already stated, it is preferred that the launching direction be perpendicular to the vehicles longitudinal axis and, to achieve this result, launcher barrel 7 may be mounted transversely of the space vehicle, the vehicle itself being provided with two doors, both of which are open at the time of the launch. Launching, of course, is accomplished by expelling the sphere through one of the open doors while the other door is open. Rocket motors presently are preferred for use with space vehicles since their thrust is very predictable and since firing of these motors under vacuum conditions has little recoil or reaction. A space vehicle such as the one presently contemplated operates in vacuum conditions. However, other power sources are contemplated and may be found equally suitable particularly in applications not directly concerned with space flight.

Launcher piston 2 cradles and supports the sphere during both the launching and flying of the vehicle and the launching of the sphere. As shown, the piston has a cup-shaped forward portion provided with an interior hemispherical surface machined to the same contour as sphere 1. Preferably, it is fabricated from an aluminum forging provided on its cup-shaped interior surface with a dry film lubricant. The outside surface also may be hard anodized and provided with a dry film lubricant to reduce friction loss. The aft face of the forward end of the piston is rib reinforced in the manner shown in FIG. 1, the ribs providing a mounting surface for the attachment of rocket motor 3. Interiorally, its cup-shaped face mounts a 1.5 inch diameter steel index pin 13 which engages the sphere to remove any rotational moments induced by the vehicle launch or the flight dynamics.

Rocket motor 3 is a Foilac motor approximately 6.75 inches in diameter by 10 inches long and weighing 14.5 pounds. The propellant can be varied to meet different thrust requirements and, in a conventional manner, ignition of the motor can be accomplished by a standard low-voltage squib (not shown). One suitable motor, for example, builds up a thrust force of approximately 6,000 pounds and, of particular importance, this motor, or any other which may be employed, should be of a type having a short-duration time interval between ignition and burn out. For reasons which will become apparent, proper operation of the apparatus requires that the burn-out time interval be precise and predictable, preferably within a matter of milliseconds.

Absorption of the thrust energy is accomplished by special snubber assemblies 4, there being two such assemblies bolted to the inside of launcher barrel 7 about 180° apart. Referring to FIG. 2, each assembly includes a housing 14 provided with a cylindrical bore in which is mounted a snubber piston 16 that also is provided with an internal bore in which a snubber rod 17 is reciprocably mounted. Snubber rod 17 extends the full length of the bore of the snubber piston and has an end portion 18 projecting through the forward end wall of the snubber piston into a secure engagement with launcher piston 2. To accommodate the engagement, launcher piston 2 is formed with a projecting boss portion 19 having an opening through which projecting end portion 18 of the snubber rod extends, the end of the snubber rod being threaded to receive a fastening nut 21. Obviously, as launcher piston 2 is driven forwardly, snubber rod 17 is carried along by its piston engagement. The trailing or rearward end of snubber rod 17, however, mounts a radially enlarged cork bumper 22 which, when snubber rod 17 has reached the end of its forward stroke, engages with end flanges 23 of the snubber piston to driveably couple the snubber piston with launcher piston 2.

The coupling of launcher piston 2 with snubber piston 16 causes the snubber piston to move forwardly and it is the forward movement of the snubber piston that is cushioned for the purpose of absorbing the kinetic energy generated by the motor and the load-carrying launcher piston. For this purpose, a honeycomb cylinder 24 is mounted in a trapped position within snubber housing 14. Thus, as will be seen, honeycomb cylinder 24 is trapped at one of its ends by inwardly extending end wall 26 of housing 14 and its other end by a radially extending flange 27 carried by snubber piston 16. The forward movement of snubber piston 16 causes the force applied to launcher piston 2 to be translated through flanges 27 to honeycomb cylinder 24 to completely absorb these forces in a rapid and predictable manner. Snubber piston 16, as will be seen, is retained within the bore of housing 14 by an end wall retainer ring 28 which engages flange 27 when the snubber piston is in its rearward disposition.

Honeycomb cylinder 24 is a hollow cylindrical member formed, for example, of 5052 aluminum having one-fourth inch hexagonal cells. The properties of the honeycomb however, may vary for different purposes, these properties, such as foil gage, adhesive and cell size establishing the honeycomb density which provides the load/deflection capability of the composite. Preferably, about 73 percent of the honeycomb tube-core is useable as a stopping distance. pre-crushing the honeycomb one-eighth of an inch eliminates a load spike which otherwise is an undesirable characteristic. Thus, FIG. 3 shows a typical crush curve which compares the honeycomb load displacement of a pre-crushed tube-core with a core that has not been pre-crushed. A typical initial "spike" load appears in the curve for the uncrushed honeycomb, while the curve for the pre-crushed honeycomb has no similar "spike." The average crush distance shown is the distance required to stop a 32 pound piston and a burnt-out rocket motor of the type which has been described. Pre-crushed honeycomb tube-core fabricated in this form is found to have very repeatable load/deflection characteristics. Also, the radial clearance for the honeycomb cylinder should be sufficient to eliminate friction during the crush stroke. Under vacuum conditions, the dynamic load/deflection curve remains essentially the same as the static load/deflection curve. At ambient conditions, however, the load carrying capability of the honeycomb under dynamic loading is increased over the static load/deflection curve due to entrapped air. Venting arrangements can be provided as needed.

Tension stud assemblies 6 are provided to retain launcher piston 2 and its sphere 1 in a retracted position until the rocket motor has built up its desired thrust level which, as stated, may be about 6,000 pounds. For this purpose, each of the assemblies includes a pyramidal-shaped launcher bracket 31 preferably machined from an aluminum bar and bolted to the inside of launcher barrel 7 about 180° apart so that, in effect, they are located about 90° from each of the two snubber housings 14. Tension studs 32 used in the assemblies may be fabricated from steel rod threaded at both ends. As shown, these studs are carried by the brackets, the rearward end of the stud being received in a suitable opening or clearance hole provided in the bracket. The rearward threaded end of each stud is secured by a nut and washer assembly 33, while the forward portion extends through a boss-like flange 34 carried by launcher piston 2 and through an opening in the wall of the launcher piston into a threaded engagement with inserts 36 provided in the surface of sphere 1.

Another feature of considerable significance is the fact that each of the tension studs is formed near its sphere interface with a reduced diameter fracture groove 37 which permits the tension studs to fracture at a particular load which, in the present embodiment, may be a load of about 3,000 pounds. As will be recalled, the presently-contemplated rocket motor generates a thrust that builds up to approximately 6,000 pounds. At this thrust level the two tension studs fracture allowing the motor to rapidly accelerate the launcher piston and its sphere load along the barrel. Since these tension studs function as locking and release elements for the sphere, the fracture grooves should be machined to close tolerances. Preferably, the rods are heat-treated to obtain proper physical characteristics. Aside from the locking and release functioning of the tension assemblies, it should be noted that the brackets of the assemblies serve as an anchor or tie-down member to clamp the sphere and the sphere piston to the inside of the launcher barrel. Thus, the brackets transmit the applied loads through the barrel assembly into the structure during the vehicle launch dynamics and during the subsequent motor thrust buildup to the point of tension stud fracture.

OPERATION

With a launcher assembled as shown in FIG. 1, rocket motor 3 is squib-ignited. Due to the clamping action of tension assemblies 6, the thrust of the motor is permitted to build up to about 6,000 pounds at which point tension studs 32 fracture allowing the thrust of the motor to accelerate the sphere and launcher piston 2 along the barrel. As will be apparent, the sphere and piston can accelerate in a free, unrestrained manner since snubber rods 17 of the snubber assemblies are permitted to move freely through the inside bore of snubber piston 16. The extent or stroke of the free travel of the snubber rods is dependent upon the dimensions of the assembly. For example, the snubber rod may be permitted to travel freely approximately through a 10 inch forward stroke, the time interval required for this stroke permitting rocket motor 3 to develop full thrust and burn-out. Milliseconds after thrust termination or burn-out, cork bumper 22 mounted on the trailing end of each snubber rod engages with inner end walls 23 of the snubber piston to driveably couple the snubber piston to the forward movement of launcher piston 2. The coupling of the two pistons commences the deceleration and cushioning of launcher piston 2 to absorb the kinetic energy that has built up. The deceleration force is transmitted aft along snubber piston 16 to its rear flange 17 which is in contact with the pre-crushed end of honeycomb cylinder 24. At the start of deceleration, the sphere separates and is ejected from this piston and the energy remaining in the piston and the burnt-out motor is absorbed by further crushing the honeycomb cylinders.

Sphere launchers of the type described have been subjected to a number of environmental and flight simulation tests including successful sphere launchings under about 10-g acceleration. The test data indicated a sphere ejection at an average velocity of 56–58 feet per second and lateral loads well within the allowable 7,000 pounds which, it will be recalled, was one of the predesign requirements. The actual maximum load recorded at tension stud fracture was 6,375 pounds. The maximum deceleration load recording during honeycomb crush was 5,500 pounds. In general, as indicated, this launcher has successfully satisfied all of the requirements of the flight objective. Thus, relatively heavy objects can be ejected at moderate velocities with a minimum of reaction forces. Obviously, within limits, this system can be scaled up or down to meet particular requirements and the mechanics of the modifications should involve relatively simple calculations. The use of the honeycomb, of course, is a one-shot application, although other launcher hardware is reuseable if it can be recovered.

As now should be apparent, the present snubbing principles are considered applicable to a relatively wide range of applications other than its special use in space sphere launching. Thus, its advantages extend to any application requiring a rapid initial acceleration of a piston followed, in a closely timed sequence, by a rapid and complete deceleration and absorption of the generated kinetic energy.

Obviously many modifications and variations of the present invention are possible in the light of the above teachings. It is therefore to be understood that within the scope of the appended claims the invention may be practiced otherwise than as specifically described.

I claim:

1. Apparatus for accelerating a piston-like member to a desired forwardly-travelling velocity and for rapidly decelerating it from said velocity, comprising:
   a housing,
   a piston-like member slideably mounted in said housing
   thrust means for rapidly accelerating said slidably-mounted member to said velocity and;
   snubber-like means for decelerating said slidably accelerated member within said housing, said decelerating means including:
   a fixed cylinder carried by said housing,
   an elongate snubber piston mounted in said cylinder for movement in a forward direction, said piston being formed with an elongate central bore and with a flange portion extending radially outwardly of its rear portion
   a snubber rod slideably mounted in said snubber piston bore,
   said rod being secured to said piston-like member for travelling in a freely slidable forward stroke in said bore a predetermined distance with said member and the rod having means for driveably coupling said snubber piston at the end of said freely slidable forward stroke, and
   cushioning means disposed in said cylinder in the forward path of travel of said snubber piston radial flange portion for decelerating the piston-like member,
   said freely movable snubber rod permitting said piston-like member to freely reach said desired velocity prior to said deceleration and said cushioning means directly and initially absorbing the full kinetic energy of said forwardly travelling piston-like member whereby recoil forces are reduced to a minimum.

2. The apparatus of claim 1 wherein said thrust means is of a type having a short-duration time thrust force, said duration time being correlated with the time required for said forward stroke of the snubber rod whereby said thrust force terminates immediately prior to the deceleration of the snubber piston.

3. The apparatus of claim 2 further including;
   means releasably securing said piston-like member in a fixed position until said thrust means develops a predetermined thrust force.

4. The apparatus of claim 3 wherein said thrust means is a high-thrust rocket-type motor having a short duration burn time.

5. The apparatus of claim 4 wherein said cushioning means is in the form of a honeycomb cylinder adapted to crushably decelerate said snubber piston.

6. Apparatus for launching a heavy object from a flying vehicle, comprising:
   a housing carried by said vehicle,
   a launcher piston adapted to releasably carry said object into launching position, said piston being slideably mounted in said housing,
   thrust means for accelerating said launcher piston to a desired forwardly travelling launching velocity, and snubber-like decelerating means for rapidly absorbing said forward thrust, said decelerating means including:

a cylinder carried by said housing, an elongate snubber piston mounted in said cylinder for movement in a forward direction, said piston being formed with an elongate central bore and with a flange portion extending radially outwardly of its rear portion, a snubber rod slideably mounted in said snubber piston and secured to said launcher piston for freely travelling in a forward stroke a predetermined distance with said launcher piston, said rod having means driveably coupling said snubber piston at the end of said stroke, and cushioning means disposed in said cylinder in the forward path of travel of said snubber radial flange portion for decelerating said launcher piston, said freely movable snubber rod permitting said launcher piston to reach said desired velocity prior to said deceleration and said cushioning means directly and initially absorbing the full kinetic energy of said forwardly travelling piston-like member whereby recoil forces are reduced to a minimum.

7. The apparatus of claim 6 wherein said thrust means is of a type having a short duration thrust time, said duration time being correlated with the time required for said snubber rod forward stroke whereby said thrust force terminates immediately prior to the deceleration of the snubber piston.

8. The apparatus of claim 7 further including;

means releaseably securing said launcher piston in a fixed position until said thrust means develops a predetermined thrust force.

9. The apparatus of claim 8 wherein said thrust means is in the form of a high-thrust rocket-type motor having a short duration time, said motor being carried by said launcher piston.

10. The apparatus of claim 9 wherein said cushioning means is in the form of a honeycomb cylinder adapted to crushably decelerate said snubber piston.

* * * * *